(12) United States Patent
Robinson

(10) Patent No.: US 6,360,145 B1
(45) Date of Patent: Mar. 19, 2002

(54) VEHICLE PLATFORM-PORTABLE CONTROLLER

(75) Inventor: Timothy Alan Robinson, Avon, IN (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/571,900

(22) Filed: May 16, 2000

(51) Int. Cl.[7] .......................... G06F 7/00; G06F 17/00
(52) U.S. Cl. ........................ 701/35; 701/1; 701/29; 701/30; 701/31; 701/32; 340/825.5; 307/10.1
(58) Field of Search ..................... 701/35, 29, 33, 701/34, 30, 122; 340/825.65, 825.16, 825.5; 307/10.1; 395/500

(56) References Cited

U.S. PATENT DOCUMENTS

| | | | | |
|---|---|---|---|---|
| 5,646,865 A | * | 7/1997 | Alfaro et al. | 701/29 |
| 5,790,965 A | * | 8/1998 | Abe | 701/29 |
| 6,128,560 A | * | 10/2000 | Ishii | 701/29 |
| 6,141,608 A | * | 10/2000 | Rother | 701/23 |
| 6,169,943 B1 | * | 1/2001 | Simon et al. | 701/29 |
| 6,181,992 B1 | * | 1/2001 | Gurne et al. | 701/29 |

* cited by examiner

Primary Examiner—William A. Cuchlinski, Jr.
Assistant Examiner—Tuan C To
(74) Attorney, Agent, or Firm—Christopher DeVries

(57) ABSTRACT

A method of transferring information between a vehicle controller and a diagnostic tool including the steps of providing communications hardware for the vehicle controller compatible with the communications hardware of the diagnostic tool, providing a virtual input/output system to interface with the communication hardware of the vehicle controller, providing application layer software that is hardware and communication protocol independent to communicate with the virtual input output system, storing the data in memory of the vehicle controller, building a data request table in the memory of the vehicle controller based on a communications protocol and data transfer rate of the diagnostic tool, the data request table including the data, data size, and transfer rates, requesting the data from the memory of the vehicle controller by the diagnostic tool, and transmitting the data from the controller to the diagnostic tool in response to the request by the device.

20 Claims, 8 Drawing Sheets

VEHICLE PLATFORM-PORTABLE CONTROLLER

TECHNICAL FIELD

The present invention relates to on-board vehicle controllers. More specifically, the present invention relates to an on-board vehicle control method and apparatus that is able to transfer data between electronic devices such as remote development, diagnostic, and software tools and on-board vehicle controllers.

BACKGROUND OF THE INVENTION

An area in the auto industry seeing tremendous change from past practices is the area of control and communication in automotive vehicles. The creation of relatively inexpensive microprocessors and the digital revolution have put the power of advanced electronics and communications into the hands of automotive engineers. Controllers, microprocessors, and other electronic devices control and monitor various systems in a vehicle such as the transmission, the internal combustion engine, braking systems, and other related systems. The information stored on the controllers in the vehicle must be accessed by remote electronic devices such as development, diagnostic, and software tools ("tools") during testing and programming. The tools are used to monitor and modify vehicle process variables and other vehicle data during testing and maintenance activities. The vehicle process variables and data indicate if the on-board electronic systems of the vehicle are functioning correctly and also control certain vehicle functions.

Vehicle controllers storing various vehicle process variables and data may be required to interface with a myriad of tools having numerous communication protocols. The communication protocols may vary from tool to tool as a function of manufacturer, and from vehicle controller to vehicle controller as a function of vehicle makes, models, or model years. Conventional vehicle controllers have limited communication flexibility and are only capable of communicating with a limited amount of tools under a specific communications protocol. In certain testing situations, more than one tool may be required for diagnostic testing of an automotive vehicle, and a vehicle controller will be required to communicate under numerous communications protocols to the tools. Presently, special external hardware and custom-made instrumentation is connected to a vehicle controller to trigger special logic embedded in the vehicle controller, generating a complex memory overlay process to allow tools to have access to the memory of the vehicle controller. This additional custom-made instrumentation may be unreliable, expensive, and difficult to maintain.

Furthermore, a number of present tools and vehicle controllers are rigidly pre-programmed for the types and amount of data that may be transferred between them. Accordingly, because of the limited flexibility of present day tools and vehicle controllers, there is a need for a dynamic adaptable method and apparatus to transfer information between a tool and a vehicle controller.

SUMMARY OF THE INVENTION

In accordance with the present invention, an on-board vehicle controller includes a processor/communication protocol independent method and apparatus to simultaneously support the concurrent use of multiple tools to monitor the state of memory locations in the vehicle controller at multiple transmission rates. The vehicle controller includes software to interface with remote development, diagnostic, and software tools having multiple communications protocols. The vehicle controller includes communications specific hardware and software that is able to receive and transmit information over a plurality of standard communication protocols such as IES-CAN, GMLAN, KWP2000, J1850, and J1939. The communication link specific software is contained in a first datalink/network layer that interfaces to a second applications layer which is functionally independent of the communications protocol.

The vehicle controller of the present invention allows tools to request periodic memory transfer from the vehicle controller memory at rates between 1 and 65,535 ms, but any technically feasible data transfer rate is considered within the scope of this invention. The actual data rates are multiples of the rate at which the method or algorithm of the vehicle controller is tasked and are calculated during a data request by a tool. The method of the present vehicle controller supports up to 255 simultaneous tools, allowing more than one tool to share a specific piece of transmitted information if the requested transfer rate and memory location is identical to that of another tool.

The vehicle controller of the present invention has many potential advantages over traditional external hardware-based systems, including reduced cost, reduced down time due to instrumentation hardware issues, increased development productivity due to simplification of the instrumentation and communication systems, and a more easily maintained system, as compared to present systems. In addition, the method of the present invention will reduce start-up time and costs associated with developing a new vehicle controller by eliminating the necessity to maintain several sets of external instrumentation hardware and software.

BRIEF DESCRIPTION OF THE DRAWINGS

The various advantages of the present invention will become apparent to one skilled in the art upon reading the following specification and by reference to the drawings in which.

DESCRIPTION OF THE PREFERRED EMBODIMENT

Figure 1:
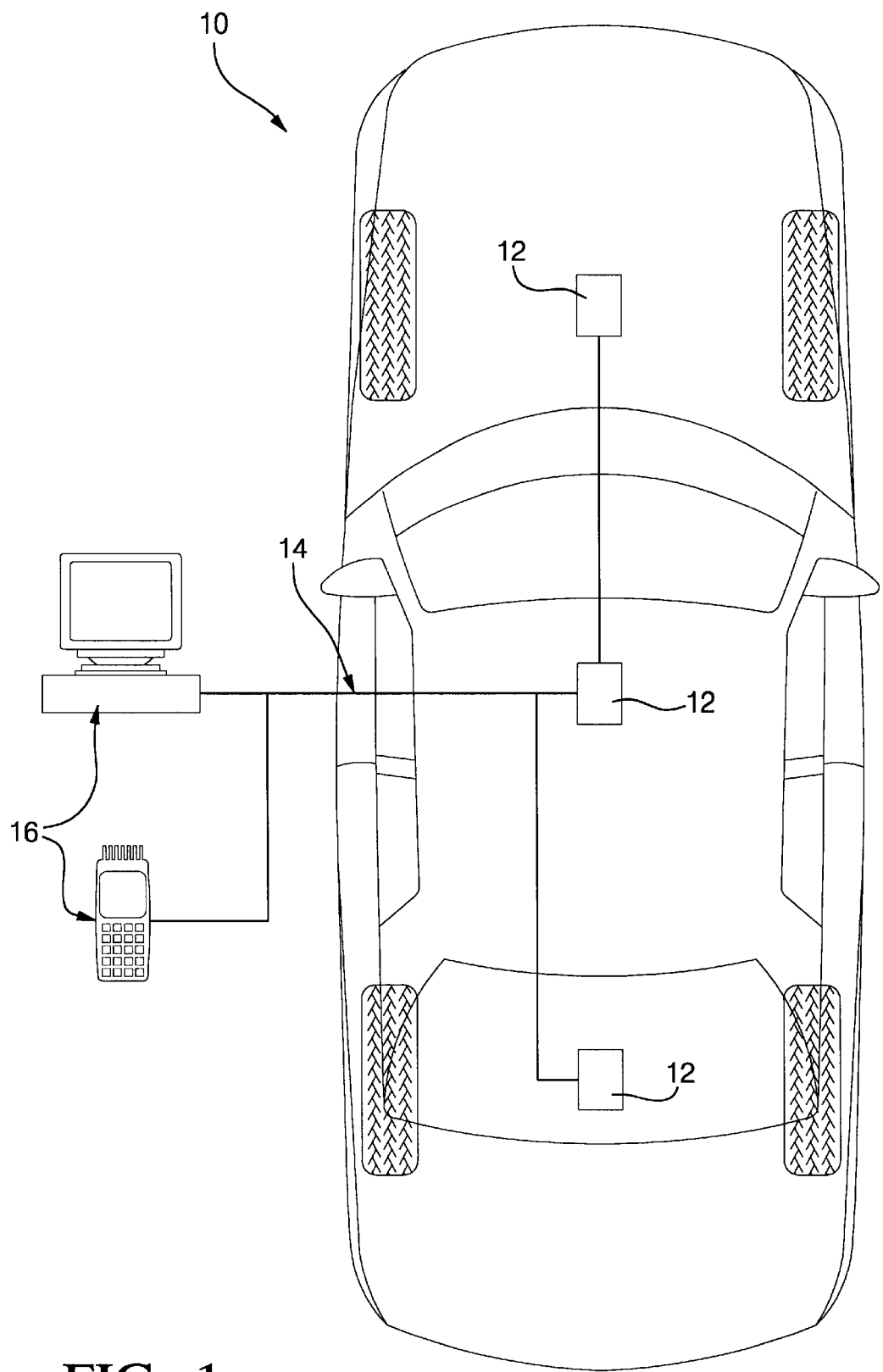
FIG. 1 is a diagrammatic drawing of a vehicle incorporating the vehicle controller of the present invention.

Referring to FIG. 1, a vehicle 10 is shown including a plurality of on-board vehicle controllers 12. The term on-board is defined as being located in a substantially permanent manner on or within the vehicle 10. The vehicle controllers 12 may include engine control modules, transmission control modules, brake system control modules, instrument control modules, and any other on-board vehicle controller. The vehicle controllers 12 communicate via a communications network 14. The communications network may comprise any known vehicle communications system such as IES-CAN, GMLAN, KWP2000, J1850, CCD, or J1939, but is not limited to such. Remote development, diagnostic, and other software tools 16 may interface with the communications network 14 to access vehicle process variables and data in the memory of the vehicle controllers 12. The variables and data are used by the tools 16 to test the vehicle 10 electronic systems, diagnose problems, and/or adjust vehicle parameters.

Figure 2:
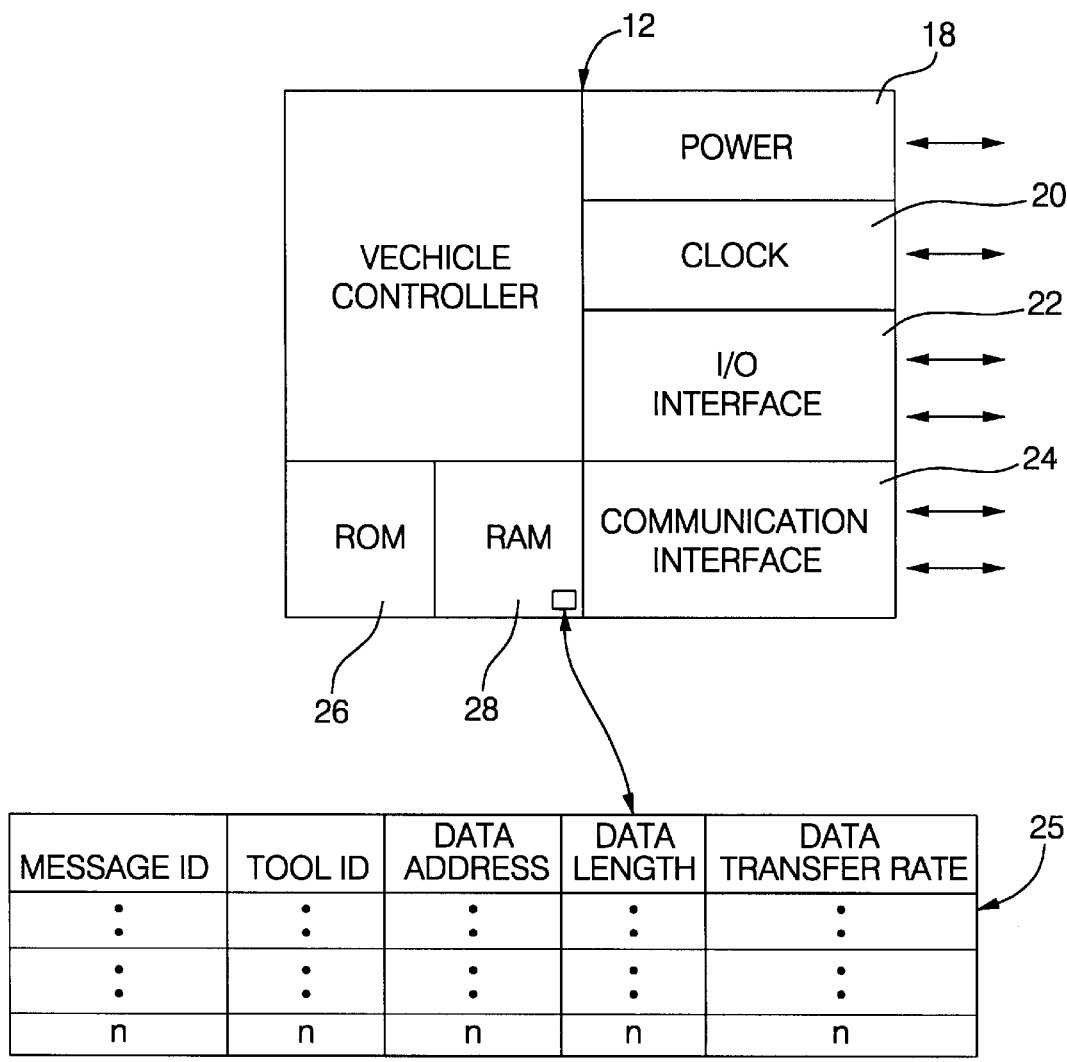
FIG. 2 is a block diagram of a vehicle controller illustrating the data request table of the present invention.

FIG. 2 is a block diagram of the vehicle controller 12 used in the present invention. The vehicle controller 12 includes a power interface 18, clock input 20, an input/output interface 22 having analog and digital capabilities, and a communications interface 24 to transfer data over the communications protocols/networks previously described in this application. The vehicle controller 12 in the preferred embodiment may communicate, via communications interface 24, over multiple communications networks simultaneously to transfer data to multiple tools.

The vehicle controller 12 further includes ROM 26 and RAM 28. The ROM 26 includes the basic operating system of the vehicle controller 12 and any other data and parameters which generally require permanent storage in the vehicle controller 12. The function of the RAM 28 includes the manipulation and storage of vehicle process variables and other vehicle data. The operating system of the vehicle controller 12 determines the specific memory locations of vehicle process variables and data in the RAM 28. FIG. 2 also illustrates a data request table ("DRT") 25 built by the vehicle controller 12 in the RAM 28. The DRT 25 is built in response to a data request from a tool 16 to transmit vehicle process variables or data from the vehicle controller 12 to the tool 16. The DRT 25 includes the tool ID, the message ID, the addresses of specific variables in RAM 28, data lengths associated with each variable, and a transfer rate to transmit the variable to the tool 12 that performed a data request. The DRT 25 will be further described in the specification with reference to the methods of the present invention.

Figure 3:
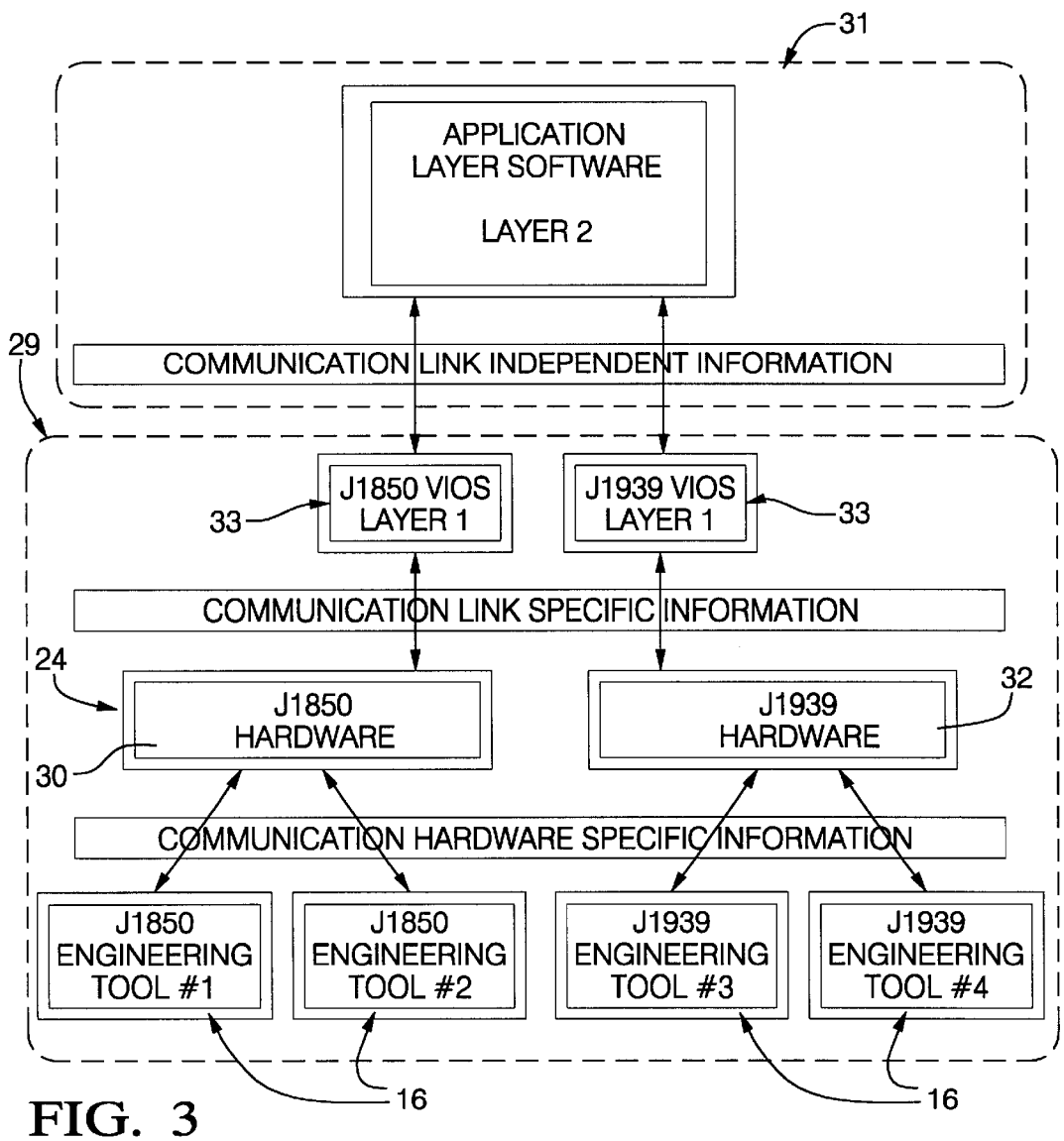
FIG. 3 is a diagrammatic drawing of the communications architecture of the vehicle controller of the present invention.

FIG. 3 is a diagrammatic drawing of the preferred embodiment of the vehicle controller 12 communication architecture of the present invention. The communication interface 24 of the vehicle controller 12 of the present invention includes specific communications hardware such as the J1850 communications interface 30 and the J1939 communications interface 32 shown in FIG. 3, but is not limited to such. In the communications architecture of the vehicle controller 12, communications specific hardware and software is included in a first datalink/network layer 29. The first layer 29 handles all of the communication link specific message processing for the previously mentioned vehicle networks, including interfacing with the hardware and receiving, transmitting, filtering, and buffering of all messages between the vehicle controller 12 and tools 16. Incoming requests from a tool 12 are reformatted into generic form by a virtual input system ("VIOS") 33 and made available to a second communication layer 31 for processing. The VIOS 33 enables the second communication layer 31 to be communication protocol non-specific. This is one of the major advantages of the vehicle controller 12 of the present invention since the second layer 31 data is generic and may be used with multiple communication protocols and their associated hardware and software. The first layer 31 formats each response to a communication link in use and handles the transmit process via the communication hardware.

The second communications layer 31 forms the core portion of the method and apparatus of the present invention. As discussed previously, the second layer 31 receives tool 16 requests, via the VIOS 33, located in the first layer 29. The information transferred by the VIOS 33 to the second layer 31 is not specific to a particular communications protocol, allowing the data generated and received by the second layer 31 to be used with multiple communications protocols after it has been processed by the VIOS 33. The second layer 31 processes each incoming tool 16 request and generates a response that is sent back to the first layer 29.

The DRT 25 is built in the RAM 28 in response to a tool 16 request for a transfer of vehicle controller 12 process variables and/or data from the RAM 28 to the tool 16. The tool 16 knows the memory locations of the vehicle process variables and data in the RAM 28 because the operating system of the vehicle controller 12 it is communicating with defines these memory locations. The vehicle controller 12 operating system will place specific vehicle process variables and data in specific fixed memory locations in RAM 28. The tool 16 includes a table of operating systems identifying the memory location of each vehicle process variable in RAM 28 for each vehicle controller 12 operating system.

A tool 16 request to schedule the periodic transmission of a memory location contains request status, tool device ID, message ID of periodic message (MID), memory location of requested data in message, data byte count, and transmit rate. Each tool 16 uses this information to decode periodic messages received from the vehicle controller 12 to extract the data from the correct message. The vehicle controller 12 uses this information to determine how to configure the DRT 25 to transmit the data requested by the tool 16. The DRT 25 is dynamic and may be readily modified by a single tool 16 or multiple tools 16. The vehicle controller 12 combines all identical requests from a plurality of tools 16 to allow maximum use of the communication link bandwidth and CPU time. The tool 16 arbitration logic is contained within the vehicle controller 12 and not an external tool 16, allowing the vehicle controller 12 of the present invention to communicate with multiple tools 16 over multiple communication protocols/links.

Figure 4:
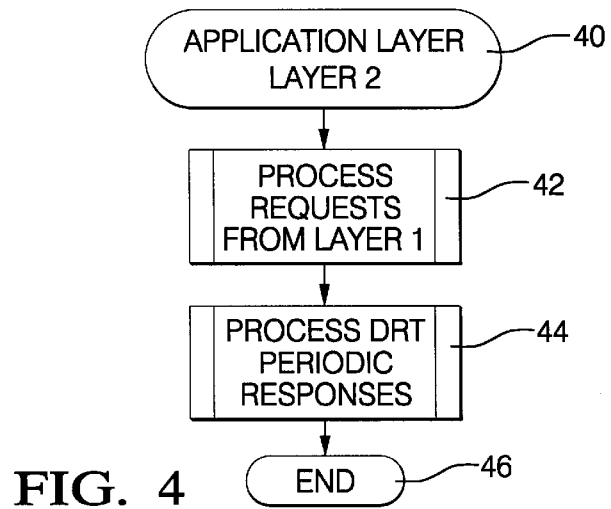
FIGS. 4–12 are flowcharts of the methods/routines used by the vehicle controller of the present invention to transfer data between a remote tool and a vehicle controller.

FIGS. 4–12 are flowcharts of the methods and routines used by the vehicle controller 12 of the present invention to transfer data to a remote tool 16. FIG. 4 is a broad overview of the method/routine of the present invention. At block 40, the second layer or application layer 31 monitors the communication network 14 for data requests from the first layer 29. Continuing to block 42, the second layer 31 processes requests from the first layer 29 generated by the remote tool 16. At block 44, the application layer builds the DRT 25 and generates the periodic responses to the tool or tools 16. The routine of FIG. 4 ends at block 46.

Figure 5:
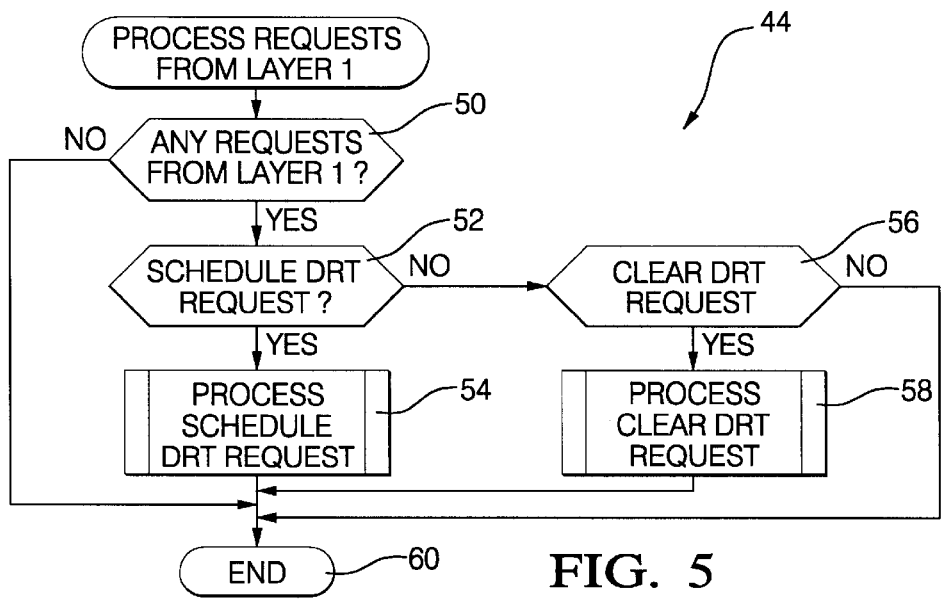

FIG. 5 is a more detailed description of the block 44 of FIG. 4 that processes requests from the first layer 29. Starting at block 50, the routine checks if there are any data requests from the first layer 29. If there are no data requests from the first layer 29, the routine will end at block 60. If there are data requests from the first layer 29, then the routine will continue to block 52 where it determines if it should schedule DRT 25 requests. If yes, the routine continues to block 54 to process a schedule of DRT 25 requests. The routine of block 54 builds DRT 25 response messages if the DRT 25 is enabled and contains valid data. If the routine does not schedule a DRT 25 request, the routine at block 56 determines if it should clear the DRT 25 request. If no, the routine ends at block 60. If yes, the routine clears the DRT 25 request at block 58.

Figure 6:
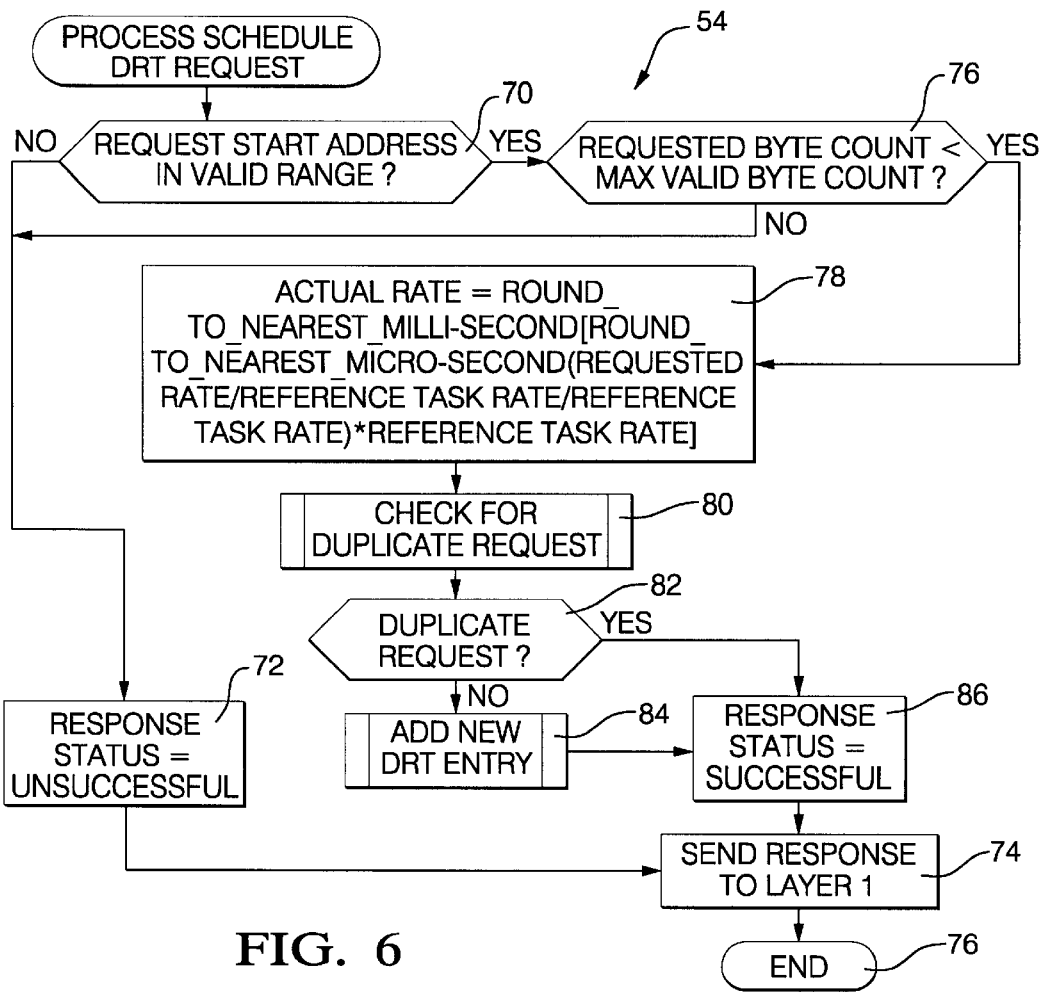

FIG. 6 is a more detailed description of the block 54 of FIG. 5. Starting at block 70, the routine checks if the requested start address in the DRT 25 request is in a valid memory range. If no, a response flag is set as unsuccessful at block 72 and sent to the first layer 29 at block 74, with the routine ending at block 76. If the start address is in a valid range, then the routine checks if the requested byte count is less than the maximum allowed at block 76. If the requested byte count is greater than the maximum allowed, then the routine will continue to block 74. If the byte count is less than the maximum allowed, then the actual data transfer rate between the vehicle controller 12 and the tool 16 will be set at block 78. Continuing to blocks 80 and 82, the routine will check for duplicate requests from a plurality of tools 16. If a duplicate request is not present, then a new entry will be added to the DRT 25 at block 84. If a duplicate request is present, then the status flag will be set as successful at block 86 and a response will be sent to the first layer 29 at block 74 with the routine ending at block 76. If a duplicate request is not present, then a new DRT 25 entry will be added at block 84 and the routine will continue to block 86 where the response status flag will be set as successful.

Figure 7:
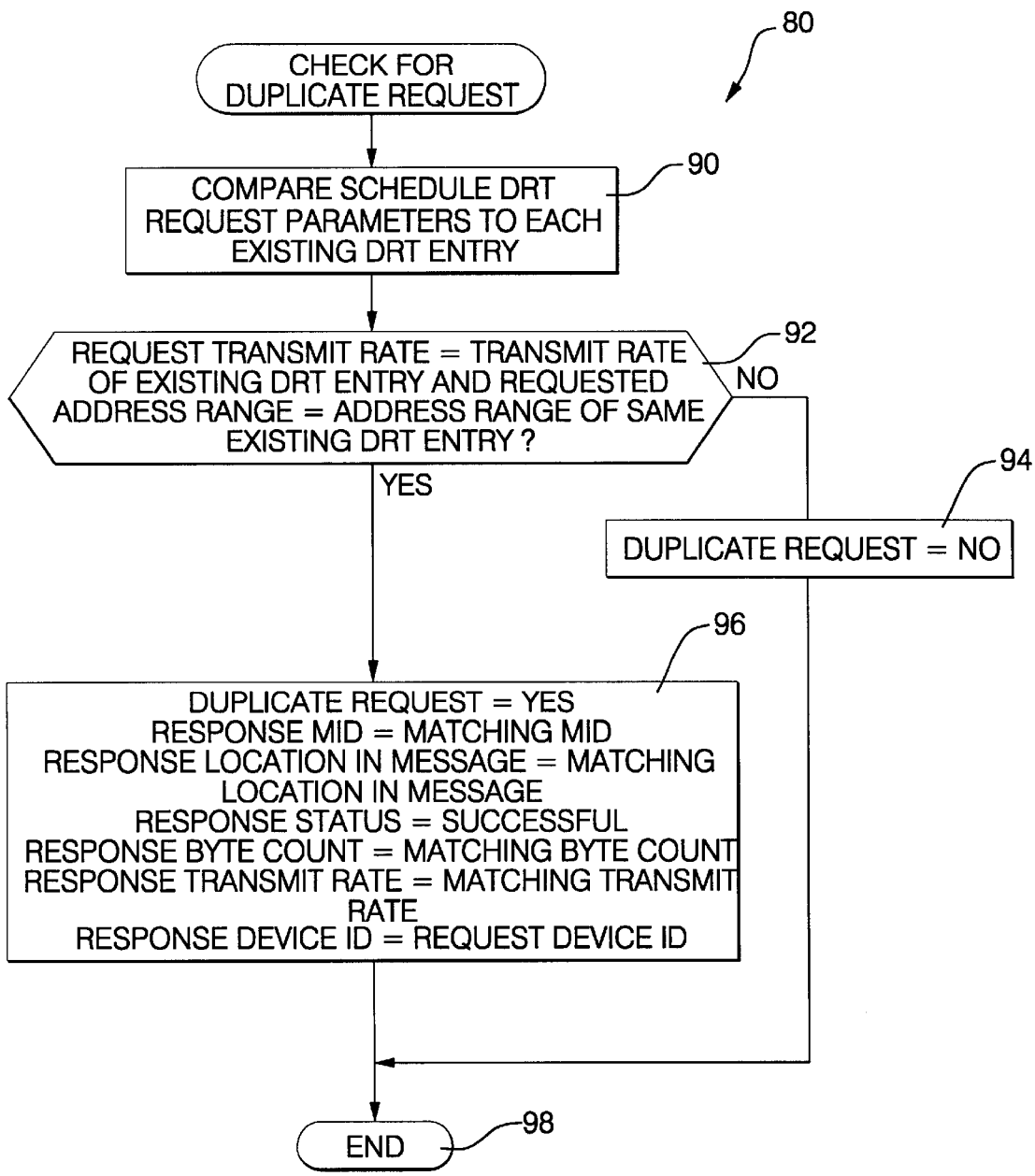

FIG. 7 is a more detailed description of the block 80 of FIG. 6. Starting at block 90, the routine compares a schedule DRT 25 request to each existing DRT 25 entry. Continuing to block 92, the routine compares the transmit rate and address range of an existing DRT 25 entry with the new request. If the new request does not match an existing DRT 25 entry, then a duplicate request flag will be set as no at block 94. If the new request does match an existing DRT 25 entry, then the flags and variables listed in block 96 will be assigned values as shown in block 96, and the routine will end at block 98.

Figure 8:
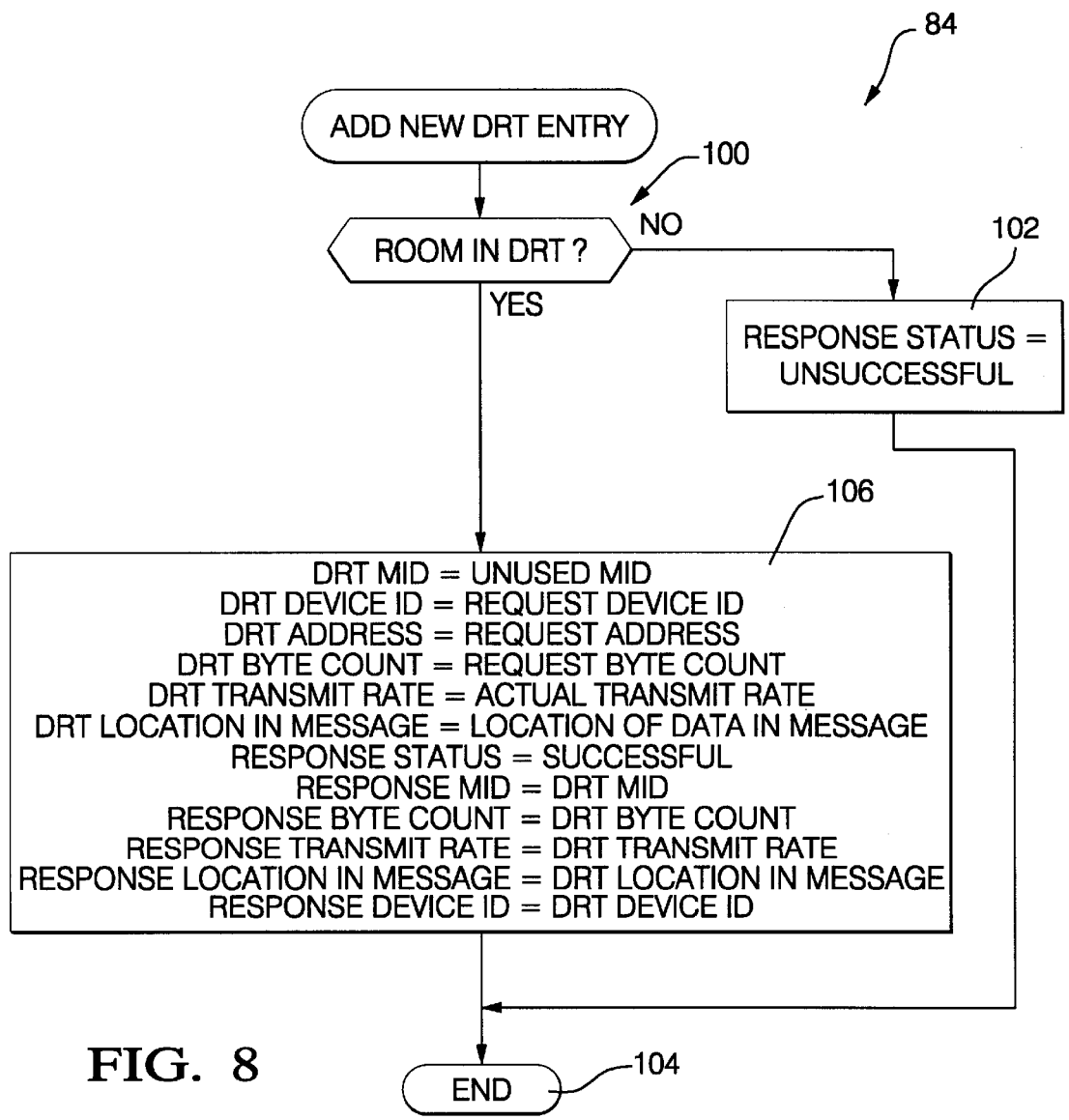

FIG. 8 is a more detailed description of the block 84 of FIG. 6. Starting at block 100, the routine determines if there is room in the DRT 25 for an additional DRT 25 entry. If no, the response status flag is set as unsuccessful at block 102 and the routine continues to block 104 where it ends. If there is room in the DRT 25 for an additional entry, then the flags and variables are assigned values as shown in block 106.

Figure 9:
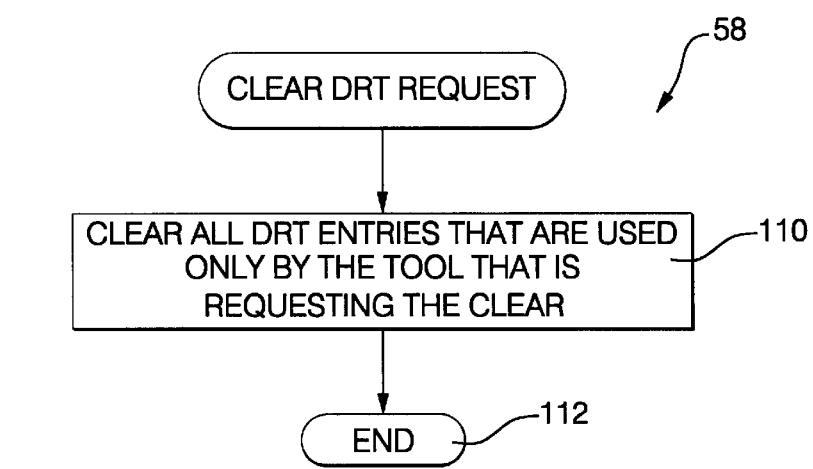

FIG. 9 is a more detailed description of the block 58 of FIG. 5. The routine at block 110 clears all DRT 25 entries that are used only by the tool 16 that is requesting the clear and ends at block 112.

Figure 10:
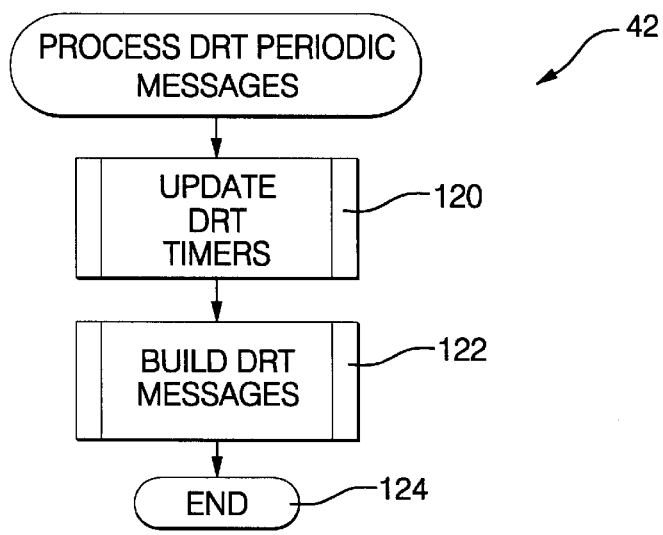

FIG. 10 is a more detailed description of the block 42 of FIG. 4. Starting at block 120, the DRT 25 timers are updated and the DRT 25 messages are built at block 122 with the routine ending at block 124.

Figure 11:
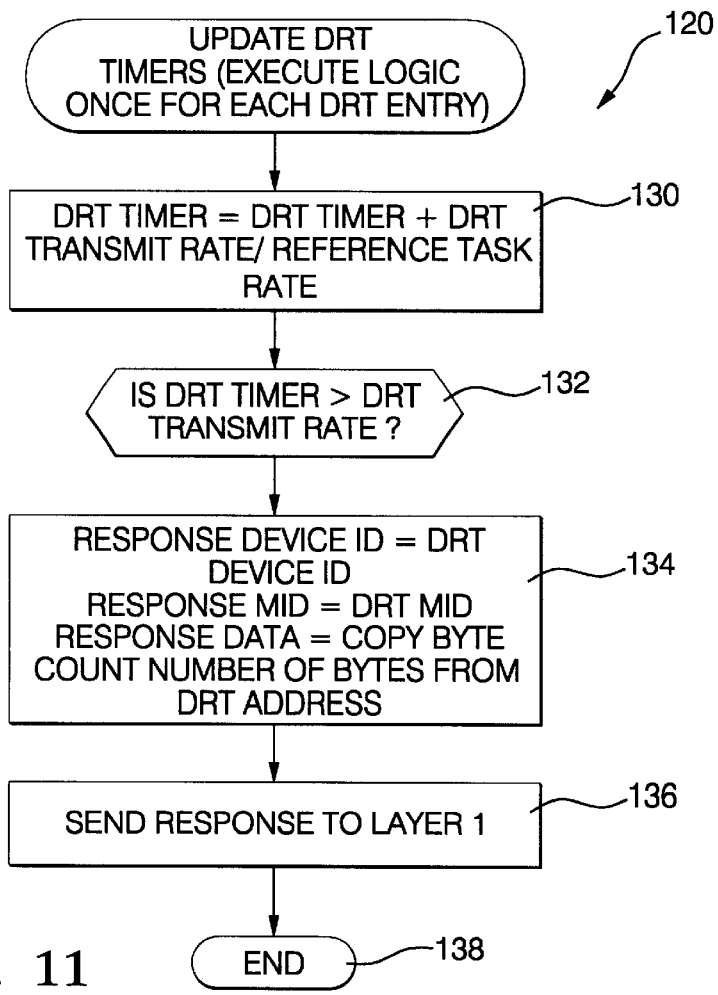

FIG. 11 is a more detailed description of the block 120 of FIG. 10. Starting at block 130, the DRT 25 timer is set equal to the DRT 25 timer+DRT 25 transmit rate/reference task rate. Block 132 sets the fastest rate that data will be scheduled to be sent to the tool 16. At block 134, flag and variable values are assigned as shown. Continuing to block 136, the routine sends a response to the first layer 29 with the routine ending at block 138.

Figure 12:
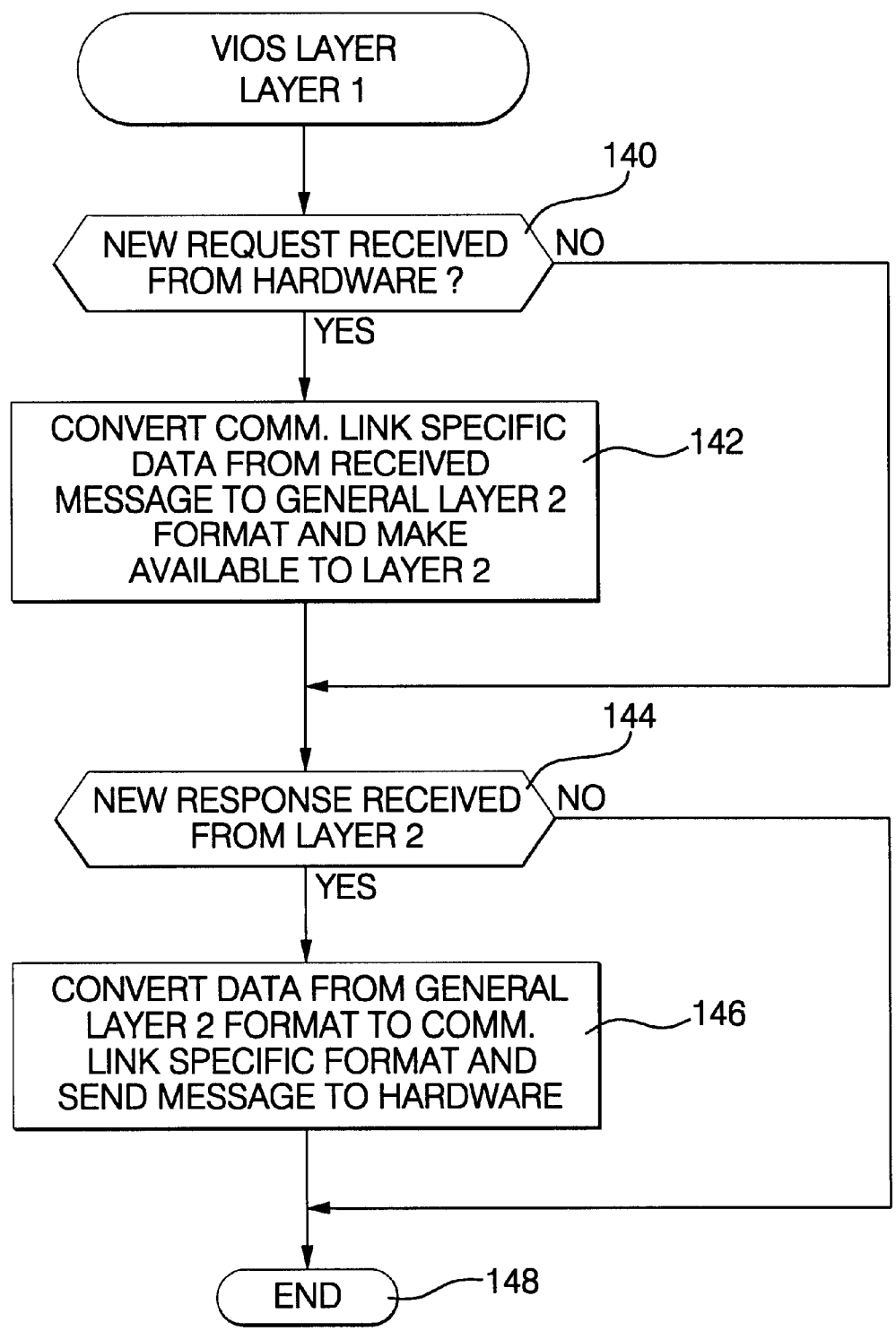

FIG. 12 is a flowchart of the operation of the VIOS 33 layer.

Starting at block 140, the routine determines if there is a new request from the hardware to the VIOS 33. If there is not a new request, then the routine continues to block 144. If there is a new request received from hardware, then the routine at block 142 converts communication protocol/link specific data from received message to general second layer 31 formats and makes the data available to the second layer 31. Block 144 determines if there is a new response from the second layer 31. If there is no new response from the second layer 31, the routine ends at block 148. If there is a response from the second layer 31, the routine continues to block 146 where the data from the second layer 31 is converted to a communication protocol/link specific format and communicated to hardware.

While this invention has been described in terms of some specific embodiments, it will be appreciated that other forms can readily be adapted by one skilled in the art. Accordingly, the scope of this invention is to be considered limited only by the following claims.

What is claimed is:

1. A method of establishing communication and transferring data between at least one controller in a vehicle and at least one device located remotely from the vehicle, the method comprising the steps of:

storing the data in memory of the controller;

building a data request table in the memory of the controller based on a communications protocol and data transfer rate of the device, the data request table including the data, data size, and transfer rates;

requesting the data from the memory of the controller by the device; and transmitting the data from the controller to the device in response to the request by the device.

2. The method of claim 1 further comprising the step of the device directing the controller to store the data in specific memory locations.

3. The method of claim 2 further comprising the step of determining the operating system used in the controller.

4. The method of claim 3 further comprising the step of using the determined operating system of the controller to identify the memory locations of variables in the memory and then storing the variables in the data request table as directed by the device.

5. The method of claim 1 further comprising the step of the controller transmitting the requested data to a plurality of remote devices.

6. A method of transferring information between a vehicle controller and a diagnostic tool comprising the steps of:

providing communications hardware for the vehicle controller compatible with communications hardware of the diagnostic tool;

providing a virtual input/output system to interface with the communication hardware of the vehicle controller;

providing application layer software that is hardware and communication protocol independent to communicate with the virtual input output system;

storing the data in memory of the vehicle controller;

building a data request table in the memory of the vehicle controller based on a communications protocol and data transfer rate of the diagnostic tool, the data request table including the data, data size, and transfer rates;

requesting the data from the memory of the vehicle controller by the diagnostic tool; and transmitting the data from the controller to the diagnostic tool in response to the request by the diagnostic tool.

7. The method of claim 6 further comprising dynamically updating the data request table as the diagnostic tool requests additional data.

8. A vehicle controller comprising:

communications hardware for receiving data transmissions from a remote device;

a virtual input/output system for interpreting the data transmission to the communications hardware to provide communications link independent information;

an applications software layer for receiving the communications link independent information;

a data request table generated in memory of the vehicle controller in response to at least one data request from the remote device;

wherein the data request table includes at least one variable and a variable size and transmission rate associated with the variable; and wherein the data request table format is determined by the data request from the remote device.

9. The vehicle controller of claim 8, wherein the data request table includes vehicle process variables.

10. The vehicle controller of claim 8 wherein the data request table is modified by the data requests from the remote device.

11. The vehicle controller of claim 8 wherein the vehicle controller has the ability to communicate with a plurality of remote devices.

12. The vehicle controller of claim 11 wherein the data request table is built in response to requests from the plurality of remote devices.

13. The vehicle controller of claim 8 wherein the remote device is a diagnostic tool.

14. The vehicle controller of claim 8 wherein the vehicle controller and the remote device communicate under the J1939 protocol.

15. The vehicle controller of claim 8 wherein the vehicle controller and the remote device communicate under the CAN protocol.

16. The vehicle controller of claim 8 wherein the vehicle controller and the remote device communicate under the J1850 protocol.

17. The vehicle controller of claim 8 wherein the vehicle controller is in communication with a second vehicle controller in the vehicle.

18. A method of establishing communication and transferring data between at least one controller in a vehicle and at least one device located remotely from the vehicle, the method comprising the steps of:

the remote device instructing the controller to store data comprising of a plurality of variables, associated variable size, and data transfer rates in specific locations in memory of the controller;

the remote device requesting the stored data from the memory of the controller by the device, the controller sending the requested data to the device; and modifying the stored data in response to multiple data requests by the remote device.

19. The method of claim 18 further comprising the step of a virtual input output system receiving requests from the remote device.

20. The method of claim 19 further comprising the step of the virtual input output system reformatting the requests into generic form.

* * * * *